UNITED STATES PATENT OFFICE.

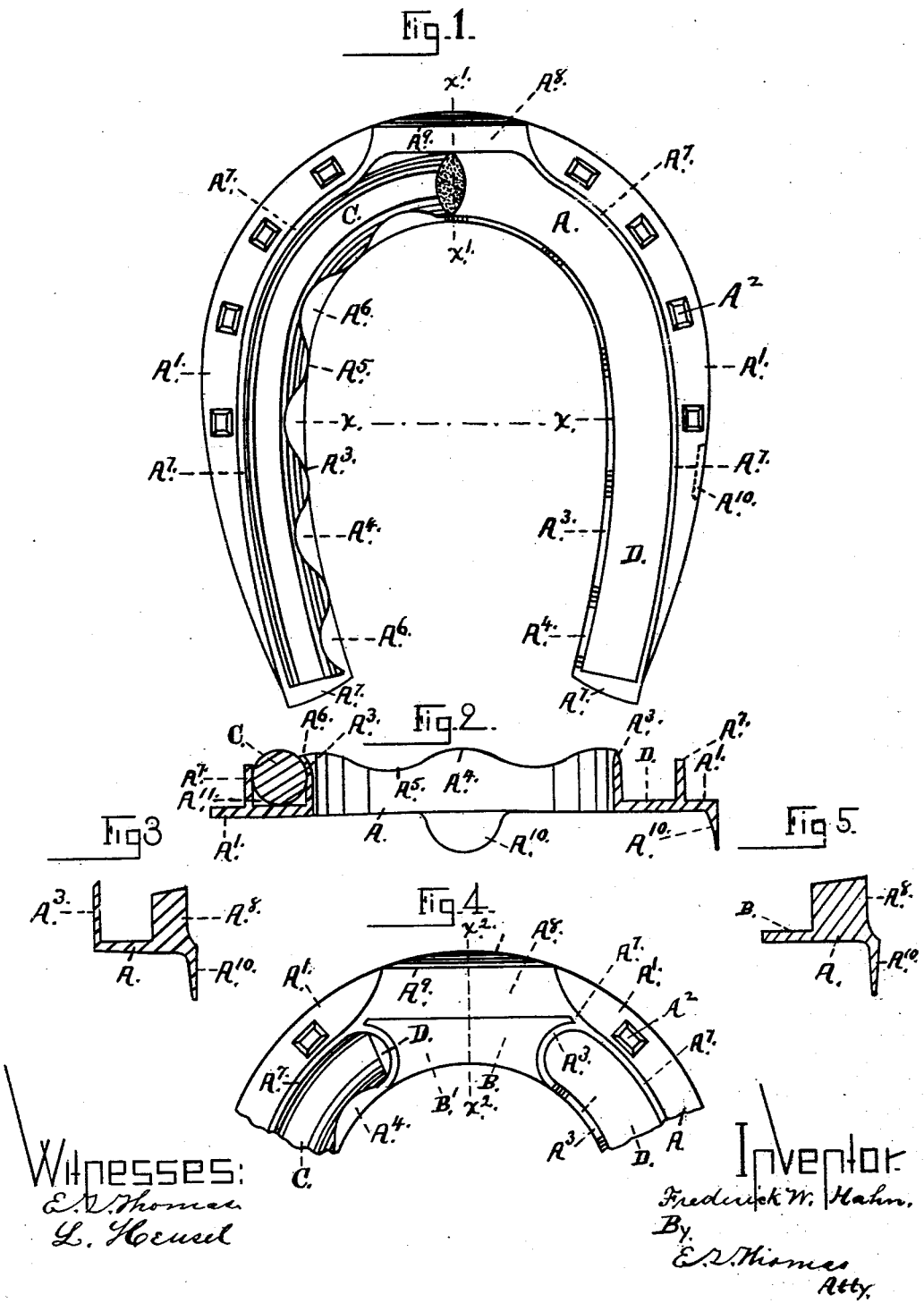

FREDERICK W. HAHN, OF NEW YORK, N. Y.

CUSHIONED HORSESHOE.

SPECIFICATION forming part of Letters Patent No. 569,009, dated October 6, 1896.

Application filed April 14, 1896. Serial No. 587,532. (No model.)

*To all whom it may concern:*

Be it known that I, FREDERICK W. HAHN, a citizen of the United States, and a resident of the city, county, and State of New York, have invented a new and useful Improvement in Horseshoes, of which the following is a specification.

The object of this invention is to prevent horses from slipping or stumbling.

The invention consists in forming a metal frame, consisting of nail-flanges, rubber supporting-grooves formed by inner and outer bands, and a calk supported by the outer bands.

Figure 1 represents a shoe having part of the rubber removed showing the groove. Fig. 2 is a cross-section of Fig. 1 on line $x\,x$. Fig. 3 is a cross-section of Fig. 1 on line $x'\,x'$. Fig. 4 represents a modification of Fig. 1, having an open space back of the calk; and Fig. 5 is a cross-section of Fig. 4 on line $x^2\,x^2$.

A in the several figures represents a metal frame formed by casting, stamping, or rolling. This frame is provided with exterior horizontal flanges $A'$, through which the necessary nail-holes $A^2$ are formed, as shown in Figs. 1 and 4.

$A^3$ in the several figures is an inner right-angle band, provided with elevations $A^4$ and recesses $A^5$, as in Fig. 2. These elevations are turned over onto the rubber, as shown in Figs. 1 and 2, at $A^6$, holding it securely in the grooves D.

$A^7$, Figs. 1, 2, and 4, are right-angle bands, which form the outer wall of the grooves D. These bands $A^7$ merge into and unite the inner bands $A^3$ at the heels of the shoe, also into the heavy calk $A^8$ at the toe, as shown in Figs. 1 and 5. The calk $A^8$ is provided with a straight front $A^9$, which forms a better edge than though left curved on the line of the nail-flanges. The calk $A^8$ is made solid, having a long and broad face to prevent its wearing too fast, and is inclined back, leaving the front edge higher than the rear, as shown in Figs. 3 and 5.

The frame A is provided with front and side clips $A^{10}$, which extend above the lower face of the horse's hoof, preventing the shoes from being forced back and inwardly.

C, Figs. 1, 2, and 4, is a round strip of rubber of sufficient length to reach from end to end of the walled grooves or cups D. This rubber is of sufficient size to fill the groove D, as shown in Fig. 2. The base of the groove D has square corners, which the round rubber does not fill, as shown in Fig. 2, but leaves a space which forms air-chambers $A^{11}$, into which the rubber is pressed when the horse's feet are on the pavement, thereby causing a greater amount of elasticity and preventing wear.

The modification shown in Fig. 4 has two sections of rubber upon each side of the shoe extending to the outer ends of the calk, leaving a blank space B, forming a thin strengthening-web $B'$ back of the calk, as in Figs. 4 and 5.

Having thus fully described my invention, what I claim as new, and desire to secure by Letters Patent of the United States, is—

1. A horseshoe-frame having bands $A^3$ and $A^7$, a solid calk supported by and uniting the bands $A^7$; the said calk having a straight front edge and beveled backward on its under side to form a sharp edge; in combination with the elastic packing, as and for the purpose described.

2. A horseshoe-frame having a band $A^3$ provided with elevations constructed to be bent over and retain the packing; bands $A^7$, a solid calk supported by and uniting the bands $A^7$; the said calk having a straight front edge and beveled backward beneath to form a sharp edge, in combination with the elastic packing, as and for the purpose described.

3. A horseshoe having grooves formed by the bands $A^3$ and $A^7$, the elevations on band $A^3$; calk and web $B'$; the said web uniting the said bands forming the grooves and the calk; in combination with the elastic packing, as and for the purpose described.

4. A horseshoe having grooves formed by the bands $A^3$ and $A^7$, the elevations on band $A^3$; calk having a straight front edge; and web $B'$; the said web uniting the said bands forming the grooves and calk; in combination with the elastic packing, as and for the purpose described.

In testimony that I claim the foregoing as my invention I have signed my name, in presence of two witnesses, this 28th day of March, 1896.

FREDERICK W. HAHN.

Witnesses:
E. T. THOMAS,
HERMAN MILLER.